(No Model.) 9 Sheets—Sheet 1.

T. F. SHERIDAN.
AUTOMATIC MACHINE FOR CUTTING SMALL PINIONS.

No. 420,836. Patented Feb. 4, 1890.

Witnesses
M. B. Harris
C. R. Ferguson

Inventor
T. F. Sheridan
By his Attorney
E. W. Anderson (No Model.) 9 Sheets—Sheet 5.
T. F. SHERIDAN.
AUTOMATIC MACHINE FOR CUTTING SMALL PINIONS.
No. 420,836. Patented Feb. 4, 1890.

Witnesses
M. B. Harris
C. R. Ferguson

Inventor
T. F. Sheridan
By his Attorney E. W. Anderson (No Model.)

9 Sheets—Sheet 9.

T. F. SHERIDAN.
AUTOMATIC MACHINE FOR CUTTING SMALL PINIONS.

No. 420,836. Patented Feb. 4, 1890.

Witnesses
N. B. Harris
C. R. Ferguson

Inventor
T. F. Sheridan
By his Attorney
E. W. Anderson

UNITED STATES PATENT OFFICE.

THOMAS F. SHERIDAN, OF SPRINGFIELD, ILLINOIS.

AUTOMATIC MACHINE FOR CUTTING SMALL PINIONS.

SPECIFICATION forming part of Letters Patent No. 420,836, dated February 4, 1890.

Application filed May 31, 1888. Serial No. 275,573. (No model.)

*To all whom it may concern:*

Be it known that I, THOMAS F. SHERIDAN, a citizen of the United States, and a resident of Springfield, in the county of Sangamon and State of Illinois, have invented certain new and useful Improvements in Automatic Pinion-Cutting Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 2:
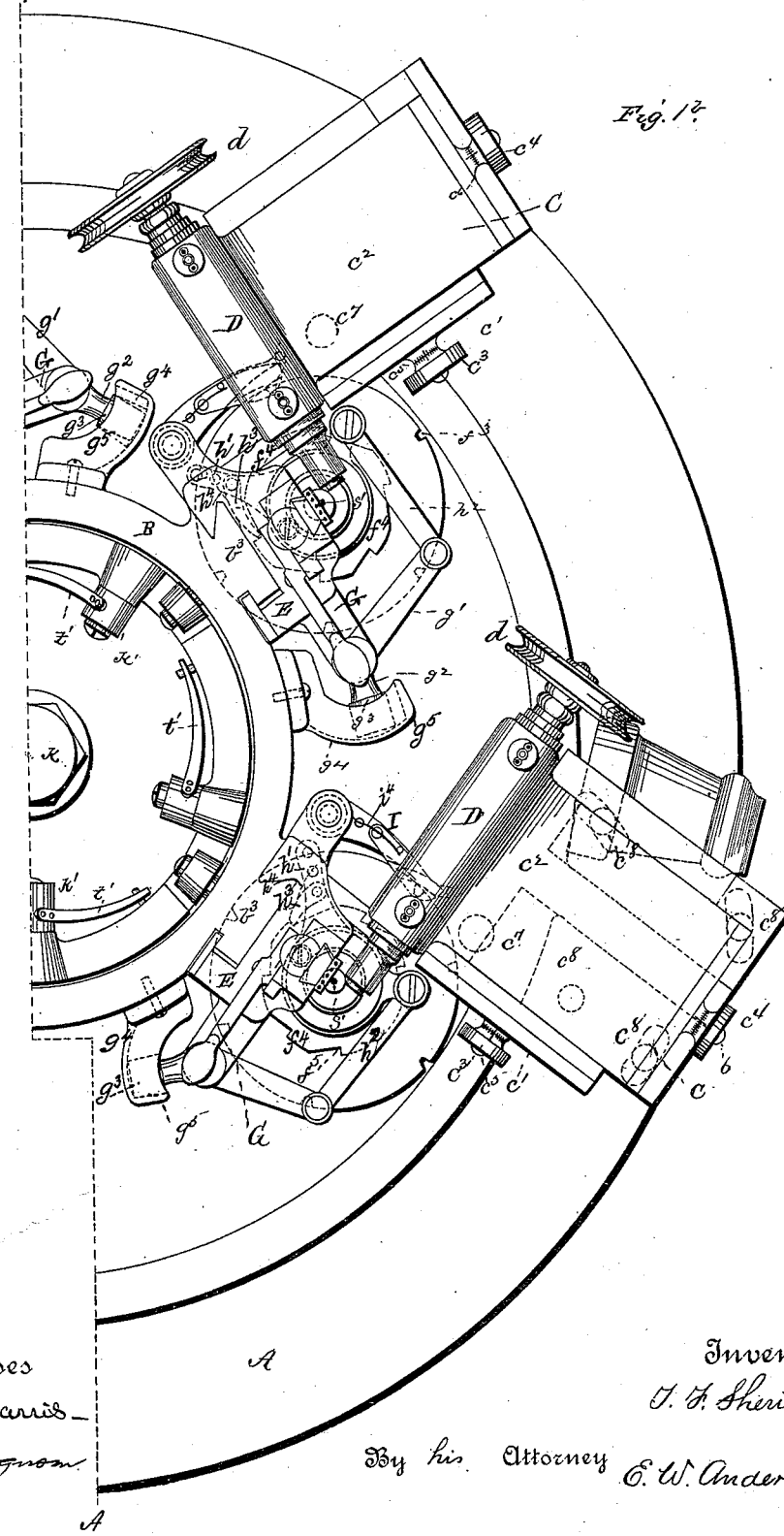
Figure 3:
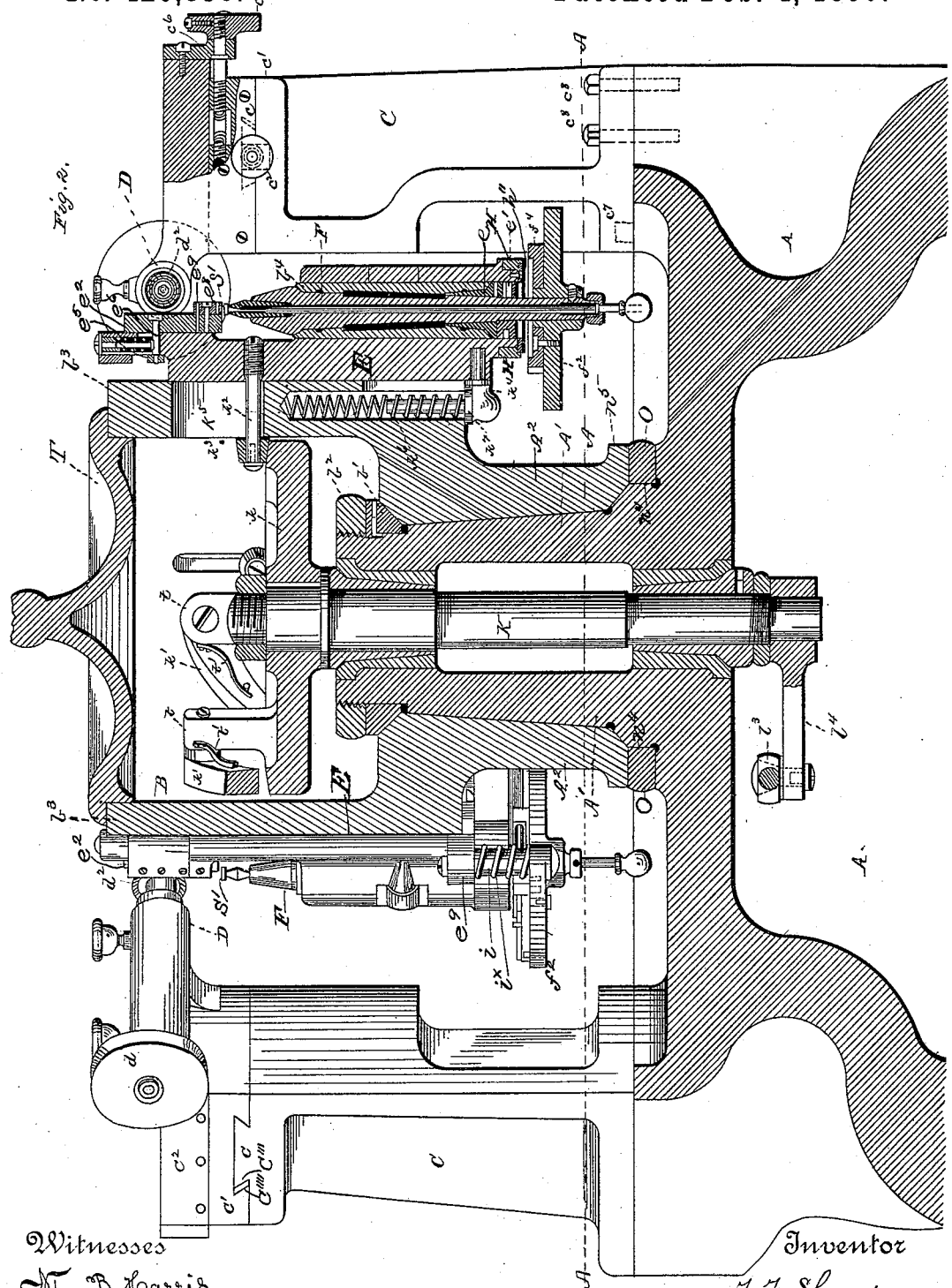
Figure 4:
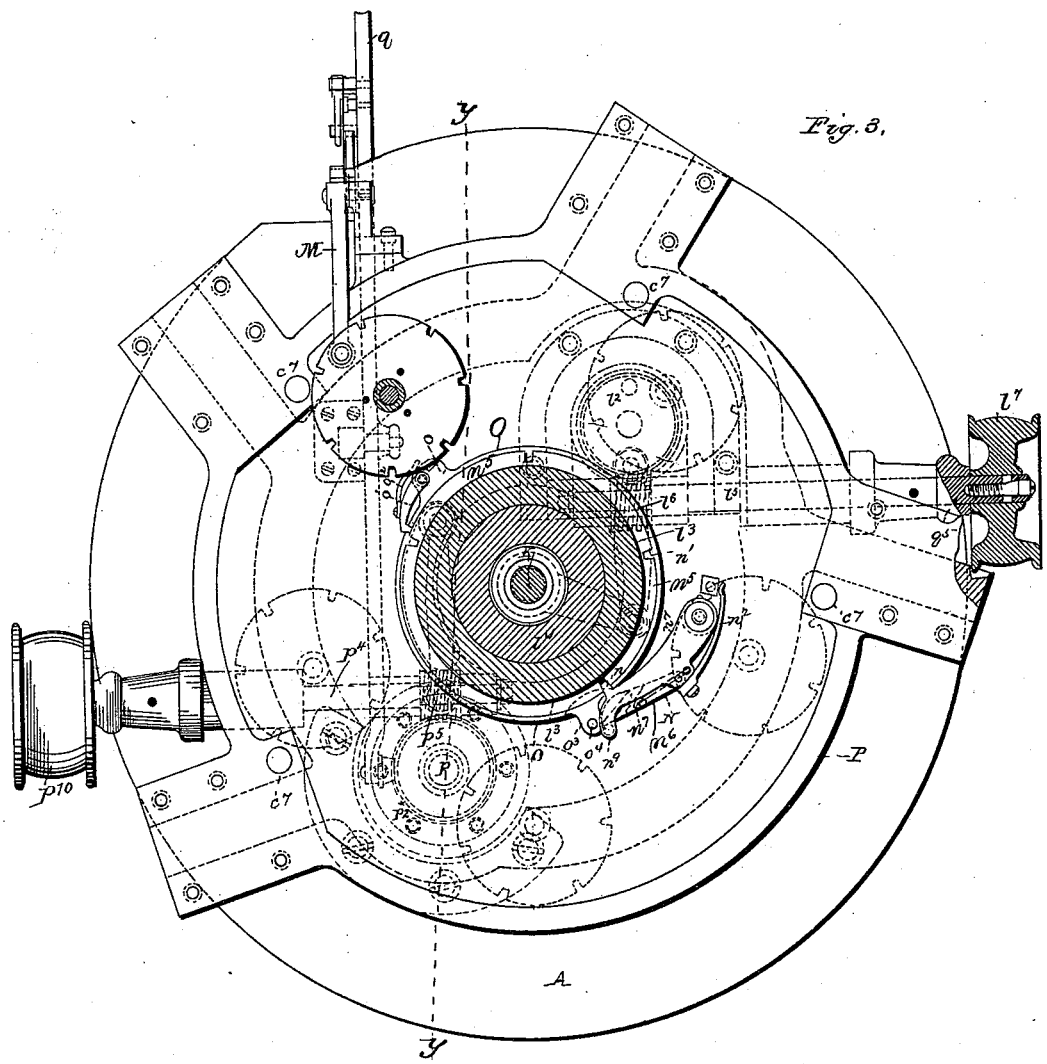
Figure 5:
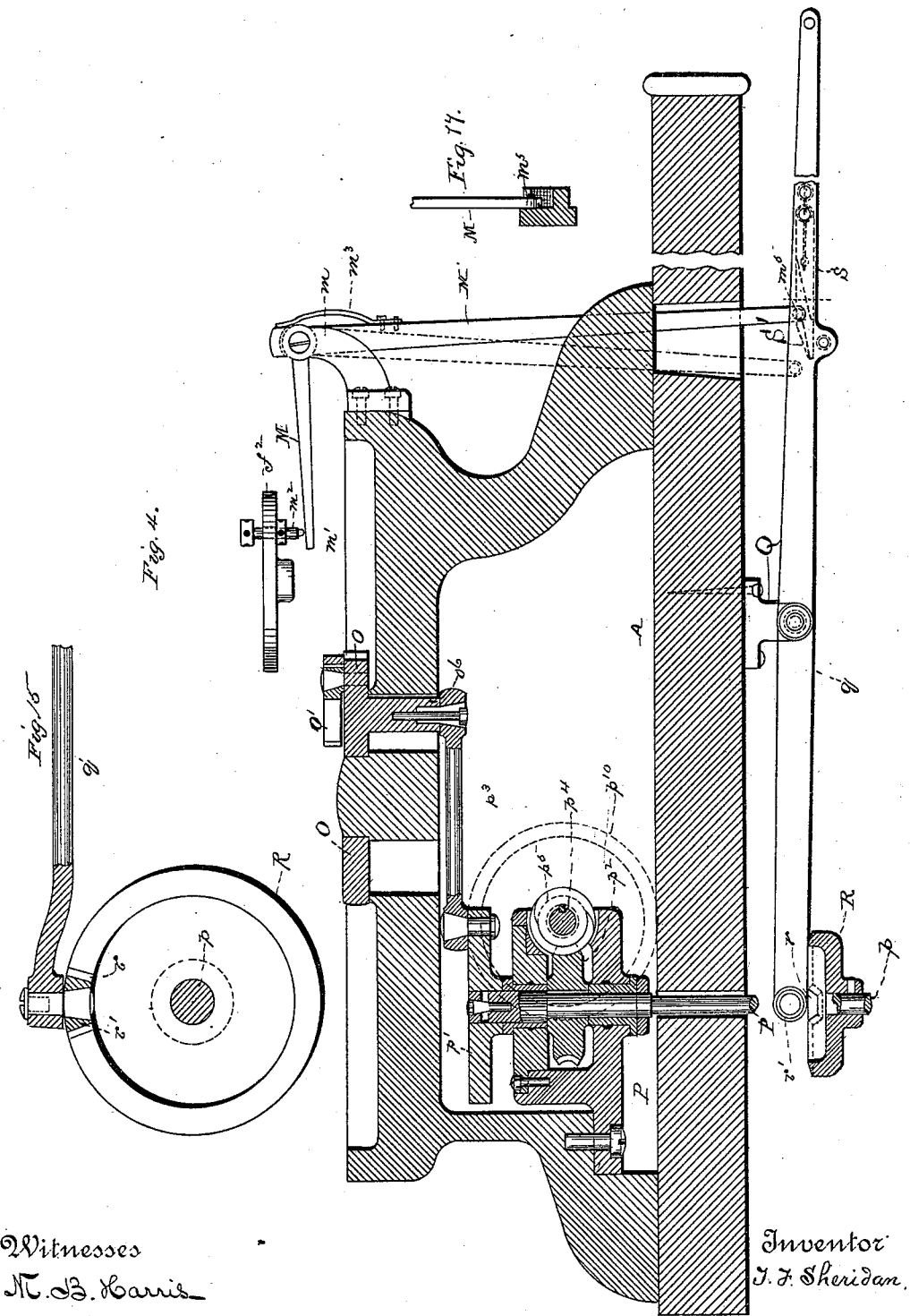
Figure 6:
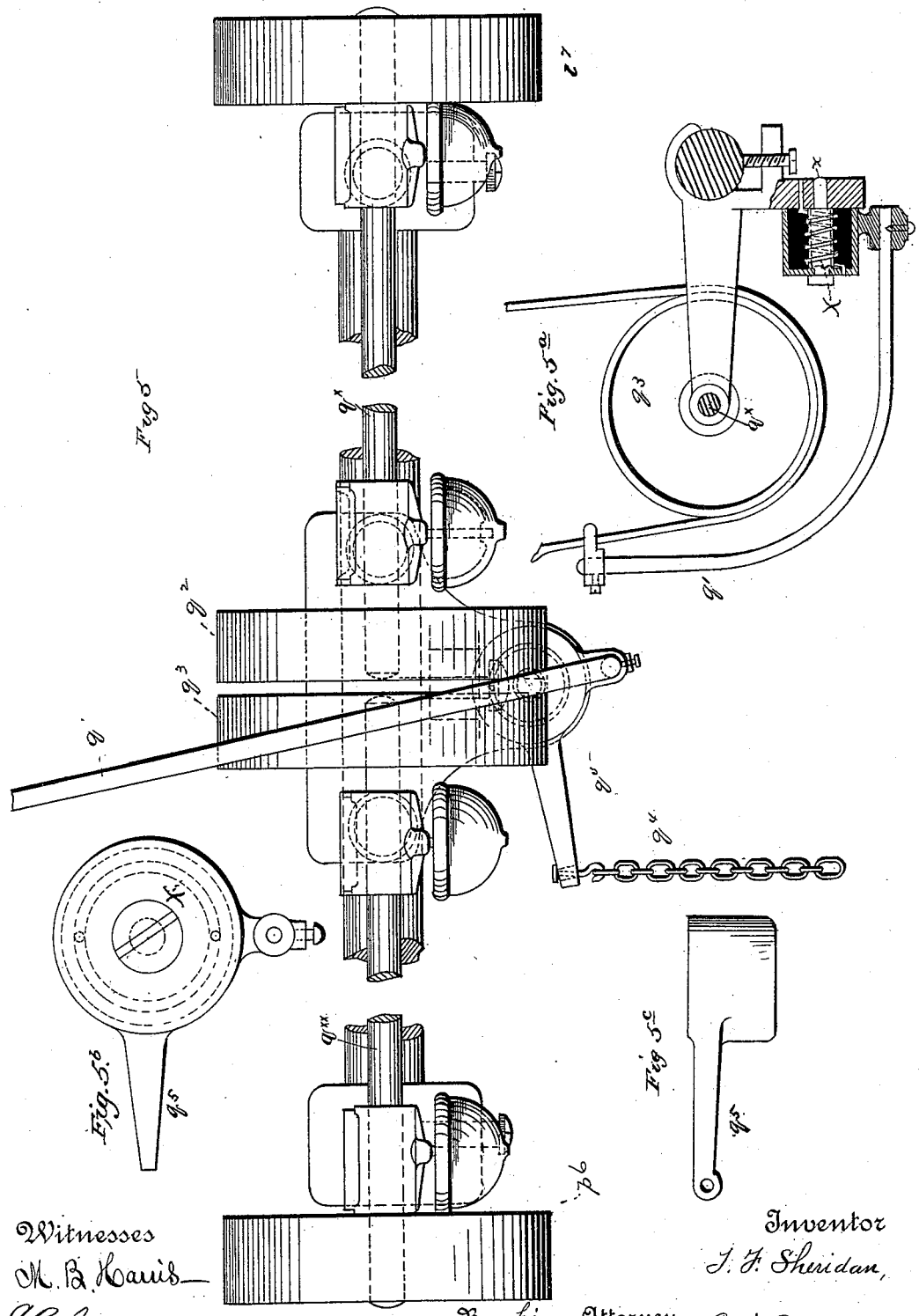
Figure 7:
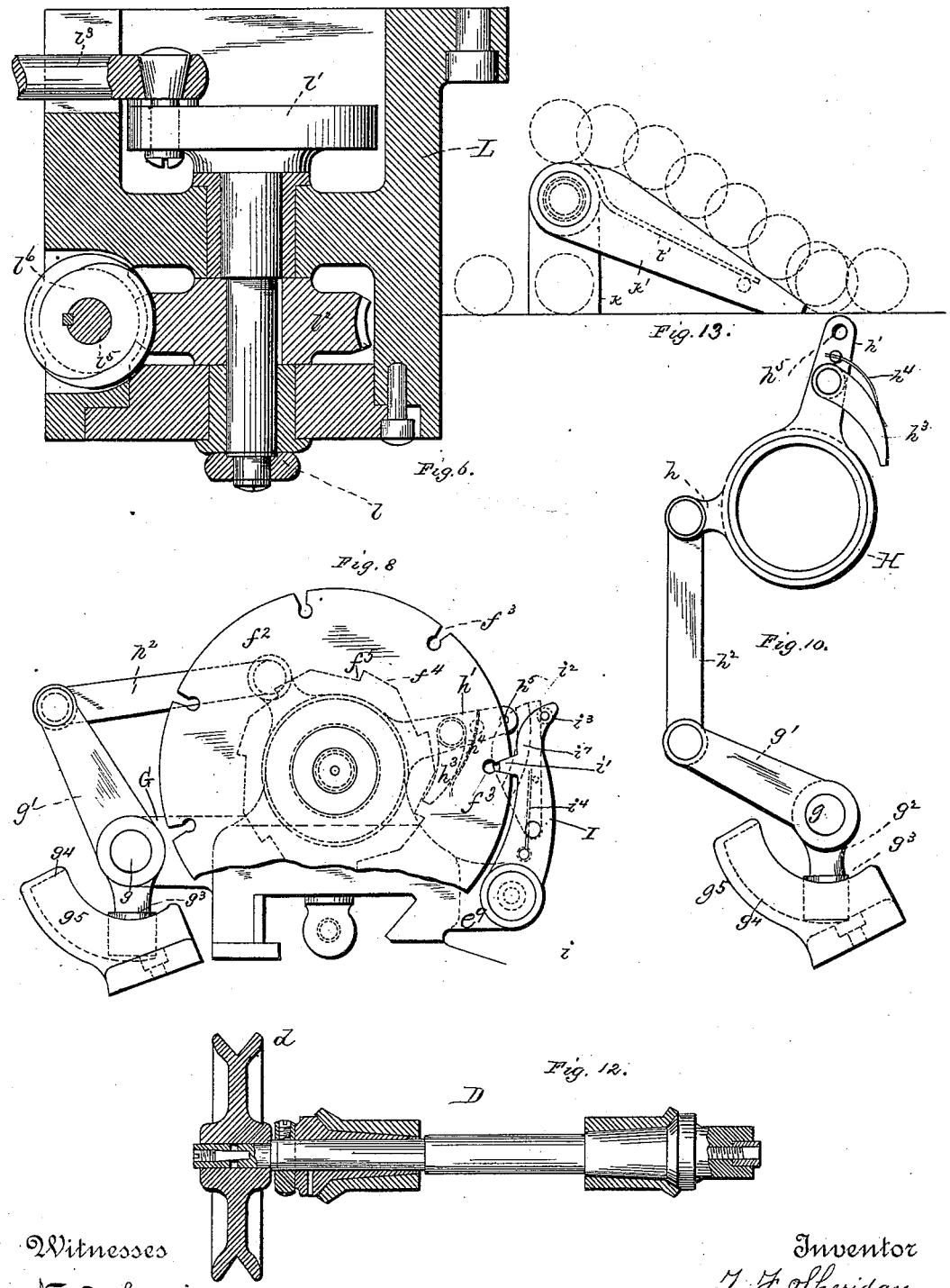
Figure 8:
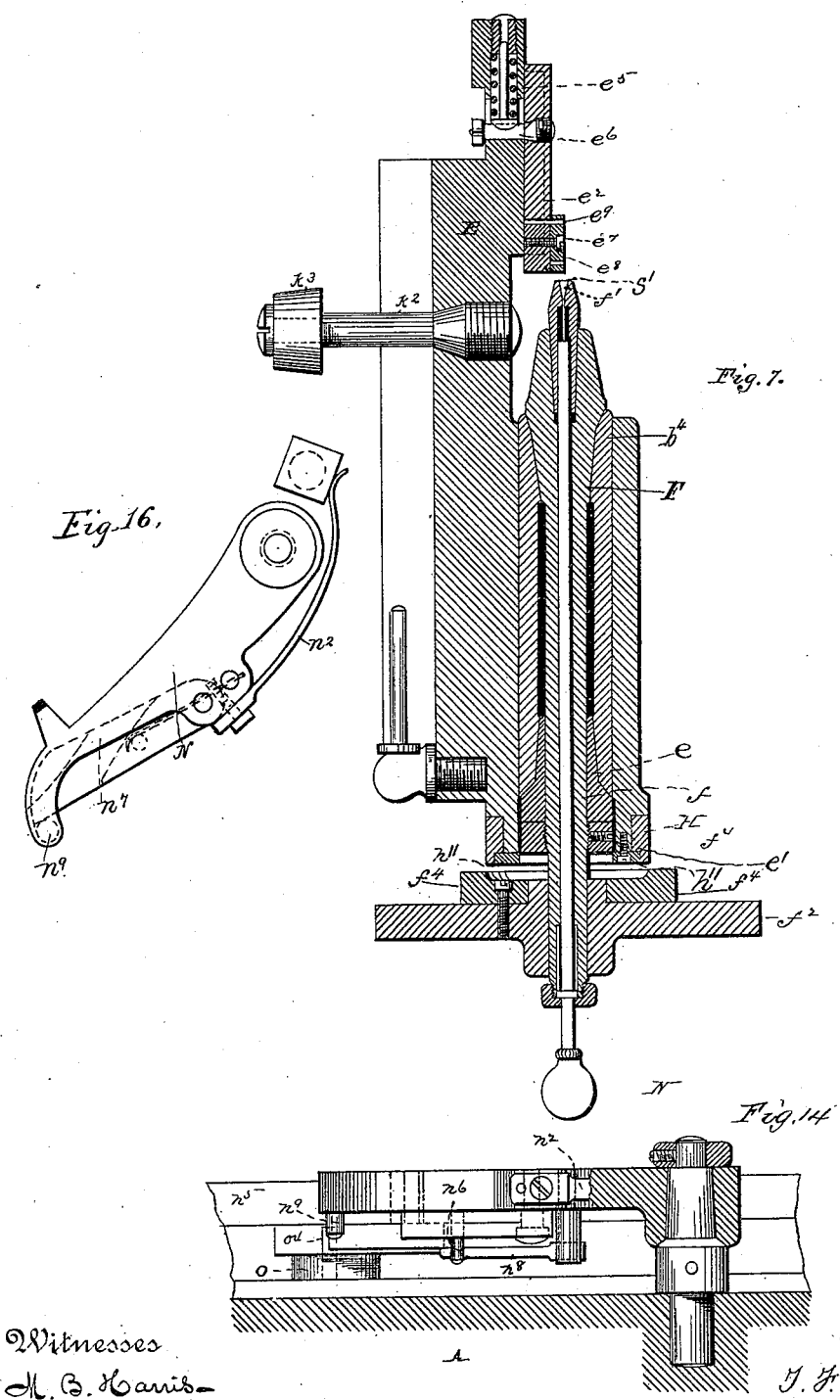
Figure 9:
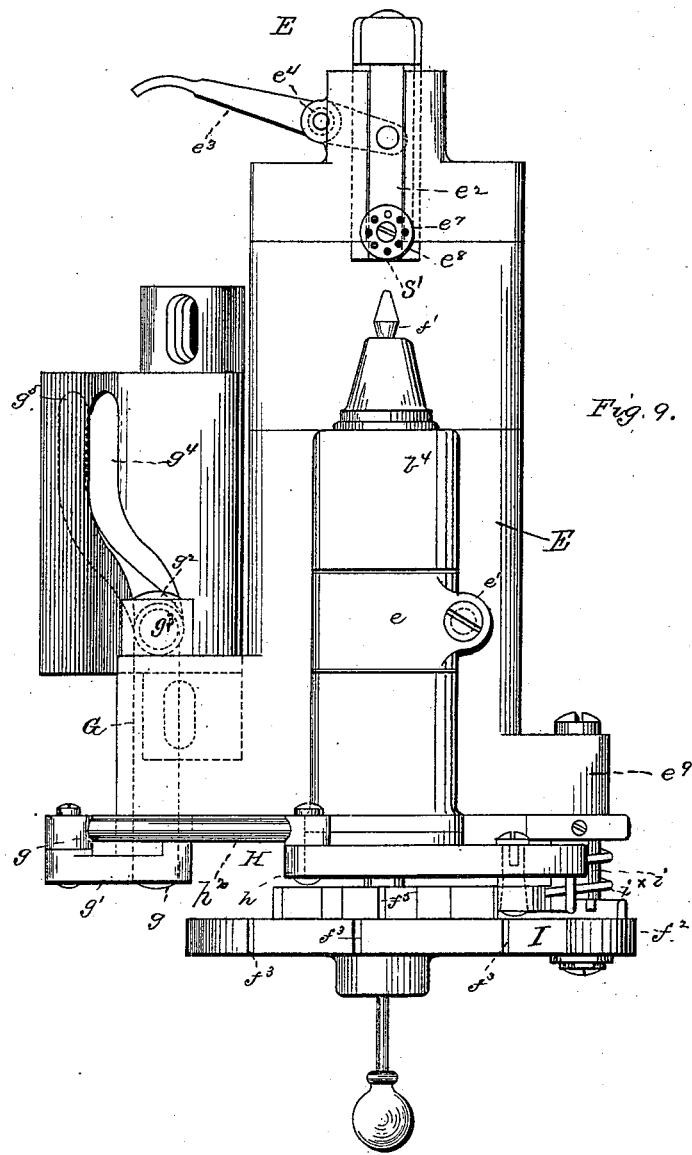
Figure 11:
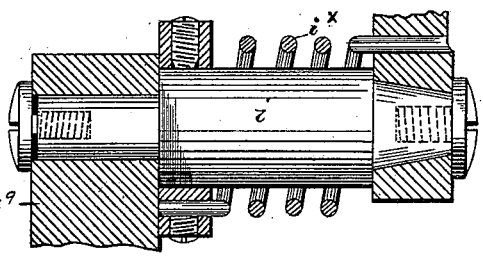

Figures $1^a$ and $1^b$ represent the plan view of my machine from the upper side. Fig. 2 is a vertical central section of the same upon the line A A, Fig. $1^a$. Fig. 3 is a longitudinal section of the said machine upon the line A A, Fig. 2. Fig. 4 is a vertical section upon the line Y Y, Fig. 3, showing the method of shifting the belts and mechanism for rotating the heads. Fig. 5 is a front view of the counter-shafts employed for driving the machine. Fig. 6 is a sectional view of the mechanism for vibrating the multiple cam. Figs. 7, 8, and 9 are section, plan, and elevation of pinion-carrier head. Fig. 10 is a plan view of the mechanism employed for rotating said head. Fig. 11 is a detail of spring and bearing for the pawl of said pinion-holding head. Fig. 12 is a sectional detail of the cutter-spindle. Fig. 13 is a view upon a plane showing one of the multiple cams by which the pinion-holding head is raised. Fig. 14 is a side elevation of pawl N and operating-levers. Fig. 15 is a plan view of face-cam R. Fig. $5^a$ is a side section of the lever $q^5$, showing the spring thereon; and Figs. $5^b$ and $5^c$ are detail views of the same. Fig. 16 is an enlarged detailed plan view of one of the pawls N and its adjunctive parts; and Fig. 17 is a similar view of the lever S applied to the lever $q$, only a portion of the latter, however, being shown.

The invention relates to that class of automatic pinion-cutting machines in which several pinion-blanks are operated on simultaneously, the pinions being held by a series of holders which exceed the number of cutters employed, said holders presenting the pinion-blanks to the respective cutters a predetermined number of times, when the motion is arrested and the holders are automatically rotated to the next cutter, and so on until the pinions are finished.

The invention consists in improvements in pinion-cutting machines, as hereinafter set forth, illustrated in the drawings, and pointed out in the claims.

Referring to the drawings, A designates the frame or base having a general cylindrical outer contour and provided interiorly with the bell-shaped recess for holding and supporting the driving mechanism. At suitable points on the base-frame are secured the four vertical frames C, for holding the cutter-heads and mechanism for adjusting the same. Each frame C on its upper end is provided with the transverse way, upon which is fitted the slide $c'$, and upon the slide $c'$ is provided the slide $c^2$, which carries the cutter-spindles D, the slide $c'$ and transverse way having a tongue-and-groove connection $C'''$ $C''''$. The cutter-spindles D revolve in the sleeves secured to the slides $c^2$ in the usual manner, and receive motion by the grooved pulleys $d$. The slides $c'$ and $c^2$ have adjusting-screws $c^3$ and $c^4$, having bearings $c^5$ and $c^6$. The outside surface of the projecting bearings are provided with an indicator-mark, and the screw-shanks are graduated annularly, so that there is an adjustment of a minute part of an inch for the cutters laterally and longitudinally. The frames C are swiveled on the pins $c^7$, (shown in dotted lines, Figs. $1^a$ and $1^b$,) and are rigidly held to the base A, as adjusted, by the set-bolts $c^8$, which project through arc-slots in the base of the frame C. This adjustment is necessary in order to bring the cutter-spindles D tangent to the pinions. By the mechanism described the cutters $d^2$ may be moved so that a greater or less depth of the pinion-teeth can be cut and each cutter can be properly aligned.

$A'$ is a vertical tapered hub projecting from the base A, upon which is fitted the sleeve $A^2$ of the table B, which is held upon the hub by means of the transversely-beveled washer or bearing $b'$ and the threaded nut $b^2$, engaging the threaded end of the hub $A'$. The table is designed to revolve freely on the hub without longitudinal displacement. At equidistant points on the outer circumference of said table are the outstanding vertical ways $b^3$, which have one edge at right angles to the face and the inwardly-beveled opposite edge, as plainly shown in Figs. 1$^a$ and 1$^b$. Fitted to said ways are the pinion-holding slides E, which are designed to move vertically thereon. The slides E are provided with cylindrical longitudinal openings $b^4$, within which the quills F are fitted, and secured by the split housing $e$ and the screw $e'$.

Fitted at the upper end of the slide E, in line with the quills F, is the bar $e^2$, designed to slide in a dovetail groove. The sliding bar $e^2$ is moved away from the center S' by means of the lever $e^3$, Fig. 9, which is pivoted on a lug $e^4$, extended from the slide E, and said bar is moved toward the center by means of the spring $e^5$, acting on the screw-pin $e^6$, which moves in a slot-opening through the head of the slide E.

Pivoted on the lower end of the slide-bars $e^2$, by means of the screw $e^7$, are the disks $e^8$, which are provided with a series of centers on the circumference adapted to fit the tapered end of a pinion-blank, the other edge of the pinion being held firmly in the tapered opening $f'$ of the center S'. This arrangement of parts is such that the downward pressure on the outer end of the lever $e^3$ causes the slide-bar $e^2$ to move away from the pinion, allowing the blank to be placed or taken out. Upon releasing the said lever the spring $e^5$ causes said bar to move against the tapered end of the pinion-blank, holding it in its center with a constant pressure.

The slides E are given rectilinear motion, by mechanism hereinafter described, for the purpose of moving the pinions held therein into and out of contact with the cutters, and in order that the said pinions may be rotated partially at each double movement of the said slide the following-described means are employed.

Secured upon the lower end of the quill-spindle $f$ is the index-plate $f^2$, which is provided with a series of indices $f^3$ upon its circumference to correspond with the number of teeth to be cut in the pinion-blank. Upon the inner face of said plate a ratchet-wheel $f^4$ is secured, which is provided with a series of teeth $f^5$, corresponding in number to the indices on the index-plate.

At the side of each slide E is a projecting lug G, which forms a bearing for the shaft $g$, at the lower end of which is fastened the lever $g'$, and at the upper end of the said shaft is secured the lever $g^2$, which has fastened to its inner end the roller $g^3$, which operates in a helical groove $g^4$ in the cam $g^5$.

Swiveled upon the lower end of the slide E and concentric with the quill F is the ring H, provided with the projecting lugs $h$. The said ring is held in place but allowed to vibrate freely by means of the ring $h''$, which is fastened to the slide E, and forms a part of the bearing and shoulder for the ring H. The lug $h$ of the ring H is pivotally connected to the rod $h^2$, which is pivoted at its other end to the lever $g'$, so that any vibration of said lever will be imparted to the ring. The ring H is further provided with an arm $h'$, which has the ratchet pawl $h^3$ pivoted thereon. Said pawl extends inwardly and rests upon the periphery of the ratchet-wheel $f^4$. A spring $h^4$, fastened at one end upon said arm, has its opposite end bearing upon the pawl, and holds the said pawl with a yielding pressure upon the ratchet-wheel.

The arrangement of parts, as described, being such that each double motion of the slide E the rollers $g^3$ of the lever $g^2$ is caused to operate in the helical groove $g^4$ of the cam $g^5$, which is fastened to the table B, a vibratory motion is thus imparted to the lever $g^2$, and this in turn, through the shaft $g$, imparts a like motion to the lever $g'$, which, through the connecting-rod $h^2$, imparts an oscillating motion to the ring H, causing the pawl $h^3$ to alternately engage with and move forward, and then pass rearwardly over a tooth of the ratchet-wheel $f^4$, so as to produce a partial rotation of the spindle $f$ at each double movement of the slide.

In order that the index-plate $f^2$ may be automatically locked and released at the proper time, a pawl I is pivoted on the stud $i$, which depends from a lug $e^9$ on the slide E, and from such pivoted bearing extends outward in a curve over the edge of and in line with said plate, and is provided near its outer end with a tooth $i'$, adapted to engage with either of the notches $f^3$. On the upper side of the pawl I is pivoted at one end a lever $i^2$, having its outer end held in contact with the pin $i^3$ by means of the spring $i^4$. The lever $i^2$ extends under the lever $h'$, and is engaged by a pin $h^5$, which projects downward from said lever. The pin $h^5$ is designed to bear against the curved edge of the lever $i^2$ to throw the tooth of the pawl out of engagement with the notch of the index-plate when the lever $h'$ moves upon its pivotal point to rotate the spindle. The tooth $i'$ of the pawl I and pin $h^5$ of the lever $h'$, together with the lever $i^2$, are so disposed that the said pin will engage the lever $i^2$, and it (the latter) will engage the pin $i^3$ of the pawl I, and thus disengage the said tooth from the index-plate just before the ratchet-pawl $h^3$ moving forward engages a tooth of the ratchet-wheel $f^4$, and thus effects the release of said pawl I, permitting it to drop into contact with the index-plate before said lever has completed its movement in a forward direction.

The upper side of the lever $i^2$ is provided with a curved guideway $i^7$, which receives the end of the projecting pin $h^5$ during the backward motion of the lever $h'$, which pulls the said lever $i^2$ laterally inward until said backward motion is nearly completed, when the lever is released and takes its normal position against the pin $i^3$. A spiral spring $i^x$ around the stud $i$ serves to hold the lever $i^2$ yieldingly against its bearing in line with the index-plate.

An automatic vertical movement of the slides E is secured by mechanism as follows: K is a vertical spindle having bearings through the center of the hub and the base A, and having secured to its upper end the cam-disk $k$, carrying a series of four cams, there being none for the front slide, which remains at rest. Each slide has a screw-pin $k^2$ extending through the slot $k^5$ in the table B. On the inner end of each pin is provided a roller $k^3$, which rolls on the upper edge of the cam-plate $k$ and the cams. The spiral spring $k^6$, pressing against the stud $k^7$, (see Fig. 2,) secured to the slide E, keeps the rollers against the plate and cams. The springs $k^6$ are preferably seated in a longitudinal bore of the table B, and a pin extending upwardly from the stud $k^7$ retains the spring in place. The arrangement of parts is such that a vibrating motion of the cam-plate $k$ produces a vertical reciprocating motion to the slide E by causing the rollers $k^3$ to move upon the cams $k'$ and the spring $k^6$ causes a return motion.

For imparting a vibratory motion to the cam-plate $k$, (see Fig. 6,) the jacket or sleeve L, secured by screws to the lower side of the base E, is provided as a double bearing for the shaft $l$, which is provided at its upper end with a crank-plate $l'$. On the shaft $l$, between the bearings in the jacket L, is a worm-wheel $l^2$. The crank-plate $l'$ is connected to the spindle K by means of the connecting-rod $l^3$ and the lever $l^4$.

Journaled at right angles to the shaft $l$ in the same frame is a second shaft $l^5$, which near its inner end is provided with a worm $l^6$, that engages with the teeth of the worm-wheel $l^2$, and at its outer end has secured to it the flanged pulley $l^7$, around which passes a driving-belt. The mechanism thus arranged gives a rotary motion to the shaft $l^5$, which imparts a vibratory motion to the slides E.

Each slide E is intended to be moved vertically in front of each cutter a number of times corresponding to the number of notches $f^3$ in each index-plate $f^2$ and then to cease such movement. To accomplish this result, the L-shaped lever M, Fig. 4, is pivoted to the bracket $m$, extending from the frame A. The horizontal portion of said lever M extends under one of the index-plates $f^2$. The lever M has a vibratory motion on its bearing, which is accomplished as follows: When the slides E have been passed before their cutters a number of times corresponding to the indices of their index-plates, a screw $m^2$ is brought into line with the lever M at $m'$, and the downward motion of the slides E causes the said screw to press on the lever, and when the lever is released by the screw the spring $m^3$, secured to the vertical part of the lever M, and having its free end against the bracket, forces the said lever back to its normal position. This movement of the lever causes the operating mechanism of the machine to cease its motion and starts the mechanism for rotating the table B, which carries the slides E in front of the next cutter, the shifting of the gearing of the aforesaid mechanism for alternately starting and stopping the same being thus effected, as will more fully appear farther on. The table B, Fig. 2, being rotated until the slides E are in proper position in front of a cutter, is locked in such position by means of a pawl N, Fig. 3, which is pivoted on the upper side of the base A, and has its toothed end $n$ in engagement with one of the indices $n'$ of the flange $n^5$ on the table B. Said pawl is held in engagement with the said notch by means of the flat spring $n^2$. The pawl N is released from engagement with the table B, and said table rotates, as presently explained, to bring the slides E into position before the next cutters in order by the following means: Fitted on the upper central portion of the base A and concentric with the circumferential groove $n^4$, formed between the base and the lower end of the sleeve of the table, is the ring O, as seen in Figs. 2 and 4. The ring O is provided with projection $o$, that carries the ratchet-pawl $o'$ on its upper side, Fig. 3. The said pawl is kept with a yielding pressure against the annular flange $n^5$ of the table by means of the flat spring $o^2$. On the opposite side of the periphery of the said ring is a projection $o^3$, carrying the pin $o^4$. On the lower side of the pawl N is pivoted a lever $n^6$, the arrangement of parts of the ring O and the pawl N being such that by the forward motion of the said ring the pin $o^4$ impinges upon the curved lever $n^6$, pressing it outward, thereby carrying the pawl-tooth $n$ out of engagement with the index-notch $n'$ just before the ratchet-pawl $o'$, moving forward, is carried into engagement with an index-notch of the same flange, and thereby causing said pawl N to be released, being thus withdrawn from the coincident index-notch $n'$, and permitted to drop into contact with said annular flange $n^5$ before the ring O has completed its motion in a forward direction. When said motion is completed, the pawl N drops into the next notch, and the table B is locked in that position until the next forward motion of the ring. When the ring O is moved rearward, the ratchet-pawl rides out of the index-notch $n'$, and has no effect on the table B. As the ring O moves backward the pawl N should not be raised. Therefore the lever $n^6$ has a lateral motion on its pivot, and its lower side is provided with a curved groove $n^4$. The projecting pin $o^4$ strikes the inner wall of said groove and, continuing its motion, presses the lever $n^6$ inwardly until said motion is almost completed, when the lever is released, and the spring $n^8$ carries it back to its normal position against pin $n^9$.

The vibrating motion of the ring O is secured by means as follows: Secured to the lower side of the base A is the frame P, and journaled in the said frame is the shaft $p$, which at its upper end is provided with a crank-plate $p'$, and between its bearings has secured to it a worm-wheel $p^2$. The crank-plate is connected to the vibrating ring O by means of the rod $p^3$, pivoted at its opposite end to the projecting stud $o^6$ (see Fig. 4) on the ring. Journaled at right angles to the shaft $p$ in the same frame is a shaft $p^4$, which near its inner end is provided with a worm $p^5$, that engages the teeth of the wheel $p^2$, and a flanged pulley $p^{10}$ is secured to the outer end of the horizontal shaft for engagement by a driving-belt.

The alternate driving of the mechanism for rotating the table B and moving the slides E up and down is secured by the following-described mechanism: Pivoted on the hanger Q on the lower side of the bench to which the machine is attached is the lever $q$, which at its farthermost end is connected with the rod $q'$, for shifting the belt from the pulley $q^2$ to $q^3$ by means of the chain $q^4$ and the vibrating double lever $q^5$, a portion of said connecting-chain being shown in Fig. 5. The pulley $q^2$ drives a counter-shaft $q^\times$ for driving the pulley $l^7$, and the pulley $q^3$ drives a counter-shaft $q^{\times\times}$ for pulley $p^6$. X is a coiled spring surrounding a journal-pin $x$ within the boxing of the double lever $q^5$, and having one end secured to a fixed bracket or hanger and its other end secured to the boxing, as shown in Fig. 5$^a$. The tension of this spring causes the shipper-lever $q'$ to keep the belt normally on the pulley $q^2$ to drive the slide mechanism, and a downward movement of the lever $q'$ by means of the lever $q''$ and the connecting-chain shifts the lever $q'$ to carry the belt onto the pulley $q^3$, as shown in Fig. 5. The lower end of the shaft $p$ is provided with a face-cam R, having a recess $r$ on its upper edge to receive a roller $r'$ on one end of the lever $q$.

The normal position of the lever M is shown by the dotted lines, as in Fig. 4. The last downward movement of the slides E brings the screw $m^2$ into line with the lever M at $m'$, thereby pressing the said lever down and causing the pin $m^5$ on the opposite end of the lever to ride up the vertical portion of the lever to ride up the incline $S'$ of the lever S applied to the lever $q$, thus depressing or pulling the shifting or free end of the latter lever down, which effects the shifting of the driving-belt from pulley $q^2$ to pulley $q^3$. This action causes, as above stated, the operating mechanism of the slides E to cease and the mechanism for rotating the slides to operate. As the chain end of the lever $q$ is depressed the opposite end is raised, carrying with it the roller $r'$ out of engagement with the face-cam R. The said cam makes one revolution when the recess $r$ comes opposite the roller $r'$ again. The action of the coiled spring in the double shifting-lever causes the roller to drop into the said recess when the belt is shifted from the pulley $q^3$ to pulley $q^2$, thereby causing the slide-rotating mechanism to cease after the said mechanism has made one revolution.

When the slide-operating mechanism is started, the lever M is released, and by the action of the flat spring $m^3$ is pressed back to its normal position without depressing the lever $q$ by its pin $m^5$ passing through an inclined way in the lever S, as seen in Fig. 4.

The cup-shaped recess in the table B is protected from dust, &c., by the cap or cover T, which may be easily removed when so desired.

Each cam $k'$ of the vibrating cam-plate $k$ is pivoted at one end on the risers $t$, and the free end is held yieldingly against the surface of the cam-plate by means of the flat steel springs $t'$, which are secured at one end to the risers, as shown, and bear against a projecting pin on the cams. During the vibration of the cam-plates the rollers $k^3$ will travel up the inclined surface of the cams and over the pivoted end thereof, and upon the return vibration the rollers pass under the cams and back to a position for the reverse movement.

A catch can be provided, so that one or more of the cams can be held in a raised position to throw its adjacent slide E out of operation.

The dead-centers of the slides E are in the disks $e^8$ on the slides $e^2$, and each disk has a series of said centers on the outer circumference, so that when one center is worn all that is necessary is to remove the pin $e^9$ and turn the disk so that another center will be presented, when the pin $e^9$ is replaced.

Figure 1:
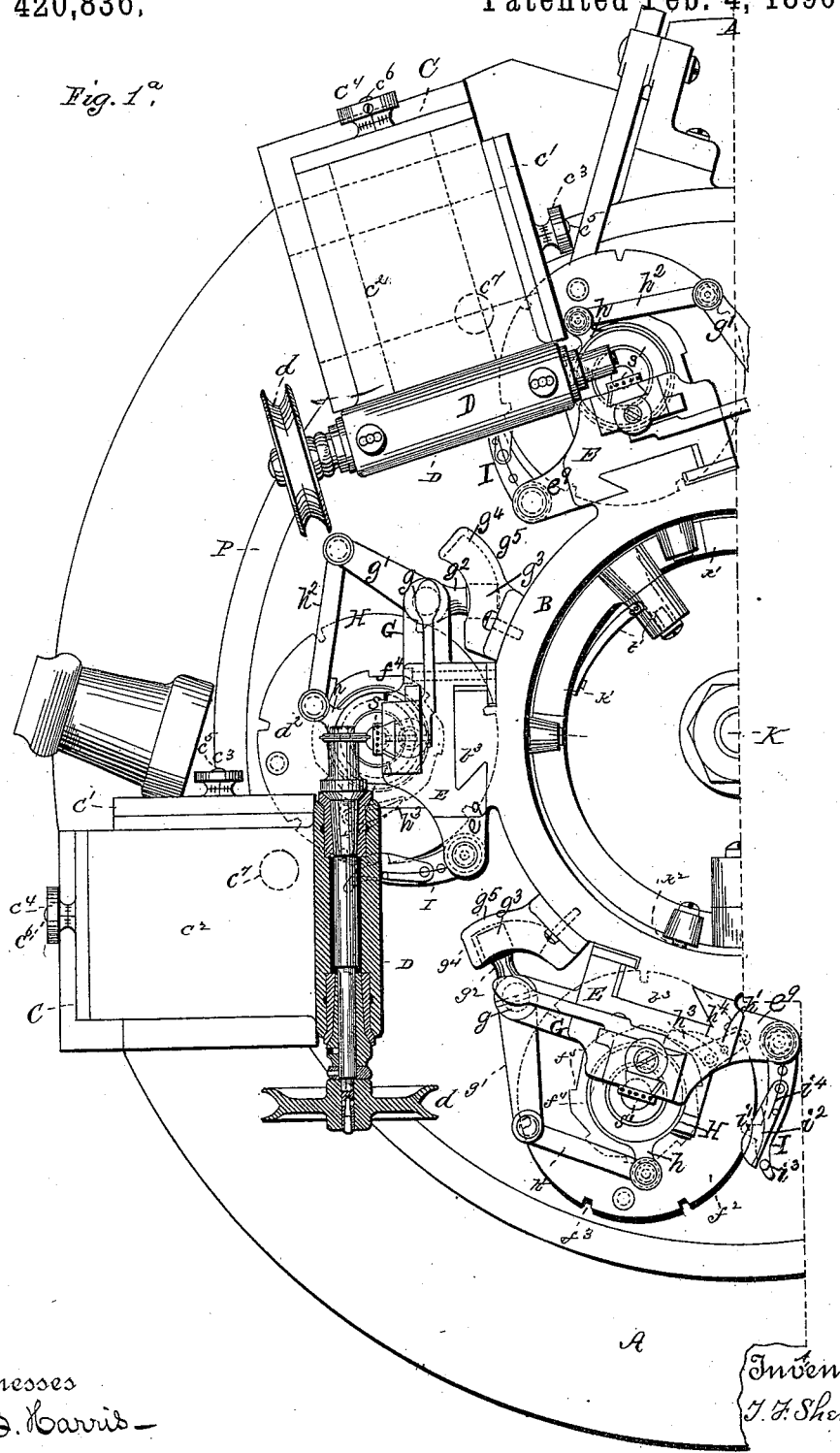

The operation of the machine is as follows: Cutters and cams for operating the reciprocating mechanism are provided for but four of the slides E, so that one slide, preferably the one nearest the operator, is always stationary and in condition for the completed pinion to be removed and a blank inserted. In starting, the cutters are set in motion and a pinion-blank is placed within the slide nearest the operator by placing one of its pivots within the female center $f'$ and allowing the slide-bar $e^2$ to carry its center into engagement with the other end of said pinion-blank, as shown in Fig. 1$^a$. The main driving-power being started, the table is moved one-fifth of a revolution, as heretofore described. At the completion of the double motion of the ring O, which rotates the head, the rotating mechanism is thrown out of action and the mechanism for operating the slides E is caused to operate, when the pinion-blank is moved against the cutter a predetermined number of times and is partly revolved after each double motion of the slide, until it has roughed out a number of pinion-leaves corresponding to the number of indices in the index-plate, when by means of mechanism before described the motion of said slide is arrested, and the automatic rotating mechanism is caused to operate again and bring said slides in front of the next center. While the first pinion is being roughly cut, as described, a second blank is placed in the slide that has been rotated to the front, and when the aforesaid table has been rotated so that the first blank is now in front of the second cutter the second blank is in front of the first cutter. Each of said cutters completes its work. The operation is thus continued, and each pinion-blank is caused to pass in front of and in contact with each of the cutters a number of times equal to the number of teeth to be cut, which is regulated by the number of notches in the index-plate. The blank having been rotated from cutter to cutter, the completed pinion comes to the front and a blank is inserted in its place.

By the mechanism shown and the arrangement of parts, while four pinion-blanks are being acted upon simultaneously by the different cutters, one slide is at rest; but at no time is the whole machine at rest. When the slide-operating machinery is at rest, the rotating of the table and slides is carried on automatically, and when said rotation ceases the slide mechanism begins.

I am aware that machines of this class have heretofore been patented, one of which is very intricate and not wholly automatic, as it is necessary to rotate the turret by hand; therefore a loss of time results at each rotation of the machine.

Another machine of this character is objectionable from the fact that the entire turret or table is raised; also the cams for rotating the pinions being rotary and the pinion-holder in front of it is not motionless, which causes the operator more or less trouble. These objections are not found in my invention, as it is entirely automatic; and, further, the slides having an up-and-down motion simultaneously, the front slide is always motionless, and any other cam can be thrown out of action, thus allowing as few cutters as is necessary; and, further, I have a greater degree of simplicity with a capability to do more accurate work on account of its direct adjustment.

Having described my invention, what I claim, and desire to secure by Letters Patent, is—

1. The combination, with the base-frame, of the swiveled vertical frames for holding the cutter-heads, the slides thereon, the adjusting-screws having the graduating-marks, and the projecting bearing having the indicator-marks, substantially as specified.

2. The combination, with the base-frame, of the vertical frames C, swiveled on the pin $c$ and having arc slots, and the adjusting-bolts projecting through said arc slots, substantially as specified.

3. In combination with the base having the integral vertical tapered hub, the table having the sleeve portion journaled on said hub, the washer beveled on its lower face, and the threaded nut engaging the threaded end of the hub, substantially as specified.

4. The combination, with the table and the base, of the outstanding vertical ways having the right-angled edge and the inwardly-beveled edge, the pinion-holding slides fitted in said ways and having the longitudinal opening for the quills, the bar $e^2$, sliding in the vertical groove at the upper end of the said slides, the lever pivoted thereto, the spring $e^5$, and the pin $e^6$, substantially as specified.

5. The combination, with the vertically-operating slide, of the quill-spindle working vertically in the slide, the index-plate having the indices in its circumference, the ratchet-wheel on the inner face thereof, and the mechanism for operating the same, substantially as specified.

6. The combination, with the slides having the projecting lug, of the shaft $g$, the lever $g'$, secured to the lower end thereof, the lever $g^2$, the roller $g^3$ thereon, and the cam having the helical groove and the operating mechanism, substantially as specified.

7. The combination, with the slide E, of the ring concentric with the quill and having the projecting lug $h$, the ring $h''$, the rod $h^2$, the lever $g'$, the arm $h'$ on said ring having the pawl pivoted thereon, and the spring fastened at one end to the arm and bearing upon the pawl, substantially as specified.

8. The combination, with the index-plate, of the pawl I, pivoted on the stud $i$, depending from the slide, said pawl extending outward over the edge of the plate and having the tooth $i$, the lever $i^2$, pivoted on the pawl and having the curved guideway on its upper side, and the spring $i^4$, substantially as specified.

9. The combination, with the base and the integral vertical hub and the vertical slides, of the spindle K, having bearings in said hub, the cam-disk having the cams thereon, the pin $k^2$, extending through the slot $k^5$, the roller $k^3$ on the inner end of said pins, and the spiral spring seated in the longitudinal base of the table, substantially as specified.

10. The combination, with the base and the jacket or sleeve secured to the lower side thereof, of the vertical shaft $l$, the crank-plate on its upper end, the worm-wheel, the shaft at right angles to the shaft $l$ in the same frame and having the worm thereon, the flanged pulley at its outer end, the connecting-rod $l^3$, and the lever $l^4$, substantially as specified.

11. The combination, with the vertical slides, of the L-shaped lever pivoted to the bracket extending from the frame A, the horizontal portion extending under the index-plate, the screw $m^2$, the spring $m^3$, and the lever $q^4$, substantially as specified.

12. The combination, with the index-plate, the table, and the base, of the pawl N, having the toothed end, the flat spring, the ring O, having the projection $o$, the ratchet-pawl pivoted thereon, the spring $o^2$, the projection $o^3$, having the pin $o^4$, the lever $n^6$, having the curved groove on its lower side, and the operating mechanism, substantially as specified.

13. The combination, with the ring O, the base, and the frame P, of the shaft $p$, the crank-plate on its upper end, the worm-wheel between the bearings, the rod $p^3$, the shaft $p^4$, journaled in the same frame at right angles to the shaft $p$, having the worm for engaging the teeth of the wheel $p^2$, and the flanged pulley, substantially as specified.

14. The combination of the lever $q$, pivoted in the hangers Q, the rod $q'$, the chain $q^4$, the double vibrating lever $q^5$, the pulleys $q^2 \, q^3$, the counter-shaft, the coiled spring within the double lever, the face-cam having the recess on its upper edge, the roller $r'$, the pin $m^5$, and the lever S, having the curved way for said pin, substantially as specified.

15. The combination, with the cam-plates having the risers, of the cams $k'$, pivoted at one end to said risers, and the free end yieldingly bearing against the surface of the cam-plate, the springs $t'$, secured to the risers and bearing upon the pin outstanding from the cams, and the mechanism for operating the same, substantially as specified.

In testimony whereof I affix my signature in presence of two witnesses.

THOS. F. SHERIDAN.

Witnesses:
A. T. WESTLAKE,
FRED. I. GETTY.